(12) United States Patent
Van Bakel

(10) Patent No.: US 10,823,280 B2
(45) Date of Patent: Nov. 3, 2020

(54) CLUTCH SYSTEM AND ACTUATION UNIT THEREFORE

(71) Applicant: Punch Powertrain N.V., Sint-Truiden (BE)

(72) Inventor: Bert Johannes Cornelis Van Bakel, Deurne (NL)

(73) Assignee: PUNCH POWERTRAIN N.V., Sint-Truiden (BE)

( * ) Notice: Subject to any disclaimer, the term of this patent is extended or adjusted under 35 U.S.C. 154(b) by 43 days.

(21) Appl. No.: 16/304,614

(22) PCT Filed: May 29, 2017

(86) PCT No.: PCT/EP2017/062893
§ 371 (c)(1),
(2) Date: Nov. 26, 2018

(87) PCT Pub. No.: WO2017/203060
PCT Pub. Date: Nov. 30, 2017

(65) Prior Publication Data
US 2019/0301592 A1 Oct. 3, 2019

(30) Foreign Application Priority Data
May 27, 2016 (BE) .................. 2016/5393

(51) Int. Cl.
*F16D 25/0638* (2006.01)
*F16H 57/08* (2006.01)
*F16H 1/28* (2006.01)

(52) U.S. Cl.
CPC ......... *F16H 57/08* (2013.01); *F16D 25/0638* (2013.01); *F16H 1/28* (2013.01);
(Continued)

(58) Field of Classification Search
CPC .... F16D 25/0638; F16H 57/08; F16H 57/082; F16H 2057/087
See application file for complete search history.

(56) References Cited

U.S. PATENT DOCUMENTS

| | | | |
|---|---|---|---|
| 3,069,929 A | 12/1962 | Hansen | |
| 4,709,795 A | 12/1987 | Ferris | |

(Continued)

FOREIGN PATENT DOCUMENTS

| | | | |
|---|---|---|---|
| CN | 103174768 A | 6/2013 | |
| CN | 104863986 A | 8/2015 | |

(Continued)

OTHER PUBLICATIONS

International Search Report dated Nov. 2, 2017 issued in International Application No. PCT/EP2017/062893.
(Continued)

*Primary Examiner* — David R Morris
(74) *Attorney, Agent, or Firm* — Pillsbury Winthrop Shaw Pittman, LLP

(57) ABSTRACT

Actuation unit for a clutch system of a motor vehicle drivetrain including: a drive plate on an input shaft of the clutch system; a clutch piston arranged to actuate a clutch of the clutch system; a compensation chamber plate defining a compensation chamber; wherein the clutch piston separates a pressure chamber between the drive plate and the clutch piston from the compensation chamber between the clutch piston and the compensation chamber plate. The pressure chamber contains a hydraulic fluid for hydraulically actuating the clutch piston, and the compensating chamber is arranged to compensate centrifugal force pressure on the clutch piston. The compensation chamber plate is fixedly connected to the drive plate.

17 Claims, 7 Drawing Sheets

(52) U.S. Cl.
CPC ....... *F16H 57/082* (2013.01); *F16D 2300/26* (2013.01); *F16H 2057/087* (2013.01)

(56) References Cited

U.S. PATENT DOCUMENTS

| | | | | |
|---|---|---|---|---|
| 5,662,198 | A * | 9/1997 | Kojima | F16D 25/0638 192/106 F |
| 6,883,656 | B2 | 4/2005 | Schmidt et al. | |
| 7,249,665 | B2 * | 7/2007 | Heinrich | F16D 21/06 192/48.61 |
| 8,297,426 | B2 * | 10/2012 | Goto | F16D 25/0638 192/48.611 |
| 9,581,209 | B2 | 2/2017 | Kramm et al. | |
| 10,066,284 | B2 * | 9/2018 | Heitzenrater | F16H 57/10 |
| 10,527,108 | B2 * | 1/2020 | Margraf | F16D 25/0635 |
| 2004/0060795 | A1 * | 4/2004 | Schmidt | F16D 13/52 192/70.2 |
| 2005/0056514 | A1 | 3/2005 | Reisch | |
| 2005/0189195 | A1 | 9/2005 | Heinrich et al. | |
| 2007/0221468 | A1 | 9/2007 | George et al. | |
| 2015/0240887 | A1 | 8/2015 | Kramm et al. | |
| 2015/0361539 | A1 | 12/2015 | Heitzenrater | |

FOREIGN PATENT DOCUMENTS

| | | |
|---|---|---|
| CN | 104895949 A | 9/2015 |
| CN | 105317877 A | 2/2016 |
| DE | 102007009964 A1 | 9/2007 |
| DE | 102007027118 A1 | 1/2009 |
| DE | 102012221653 A1 | 6/2013 |
| DE | 102015108802 A1 | 12/2015 |
| EP | 0207685 A1 | 1/1987 |
| EP | 1382872 A1 | 1/2004 |
| EP | 1568906 A1 | 8/2005 |
| FR | 924404 | 3/1946 |
| JP | 2-8514 A | 1/1990 |
| JP | 2012-211666 A | 11/2012 |
| WO | 2008/138506 A1 | 11/2008 |

OTHER PUBLICATIONS

Notice of the First Office Action dated Dec. 4, 2019 issued in corresponding Chinese Patent Application No. 201780044153.8 with English translation (24 pages).
Search Report dated Jan. 19, 2017 in corresponding Belgium Application No. BE2016/5393 with English translation.
International Preliminary Report on Patentability dated Nov. 27, 2018 issued in corresponding International Patent Application No. PCT/EP2017/062893.

* cited by examiner

CLUTCH SYSTEM AND ACTUATION UNIT THEREFORE

CROSS-REFERENCE TO RELATED APPLICATION

This application is a national stage entry of PCT/EP2017/062893, filed May 29, 2017, which claims priority to Belgium Application No. 2016/5393, filed May 27, 2016, the entire contents of both of which are herein incorporated by reference in their entireties.

The invention relates to an actuation unit for a clutch system of a motor vehicle drivetrain.

An example of a known clutch system is described in WO 2008/138506 disclosing a double clutch arrangement for installation in a motor vehicle drivetrain between a driving unit and two transmissions. Each clutch is actuated by at least one piston of a hydraulic actuator. An actuation unit of such a clutch arrangement comprises a drive plate mounted on an input shaft of said clutch system, a clutch piston arranged to actuate a clutch of said clutch system and a compensation chamber plate defining a compensation chamber. Said clutch piston separates a pressure chamber between said drive plate and said clutch piston from said compensation chamber between said clutch piston and said compensation chamber plate, said pressure chamber containing a hydraulic fluid for hydraulically actuating said clutch piston, and said compensating chamber being arranged to compensate centrifugal force pressure on said clutch piston.

A disadvantage of an actuation unit for such a prior art clutch system is that it takes up quite a lot of space within a motor vehicle drivetrain.

It is an aim of the present invention to alleviate the above-mentioned problem. In particular, the invention aims at providing a relatively compact actuation unit for a clutch system of a motor vehicle drivetrain.

To this aim, there is provided an actuation unit for a clutch system of a motor vehicle drivetrain comprising:
- a drive plate mounted on an input shaft of said clutch system;
- a clutch piston arranged to actuate a clutch of said clutch system;
- a compensation chamber plate defining a compensation chamber;

wherein said clutch piston separates a pressure chamber between said drive plate and said clutch piston from said compensation chamber between said clutch piston and said compensation chamber plate, said pressure chamber containing a hydraulic fluid for hydraulically actuating said clutch piston, and said compensating chamber being arranged to compensate centrifugal force pressure on said clutch piston, characterized in that said compensation chamber plate is fixedly connected to said drive plate.

By fixing said compensation chamber plate to said drive plate instead of fixing it to the input shaft of the clutch system, as is usually the case in prior art systems, the compensation chamber plate is submitted to the same rotational movement of the input shaft, which is transmitted to the compensation chamber plate via the drive plate. A connection between the compensation chamber plate and the input shaft of the clutch system can therefore be omitted, which saves space and provides a more compact actuation unit for a clutch system.

In a preferred embodiment, a cylindrical wall of said compensation chamber plate can comprise at least two protruding fixation elements arranged to be fixedly connected to said drive plate, for example via a bolt, thus providing a solid coupling which is easy to build. These fixation elements can be protruding radially from said cylindrical wall of said compensation chamber plate, or axially.

In a more preferred embodiment, said drive plate can comprise a set of at least two receiving slots each arranged to receive one of said at least two protruding fixation elements, which can for example be fixation elements axially protruding from said cylindrical wall of said compensation chamber plate. Such a coupling secures a solid transmission of rotational movement from said drive plate to said compensation chamber plate, as it rotationally locks the compensation chamber plate to the drive plate.

Said compensation chamber plate can preferably be welded to said drive plate, providing an easy-to-realize yet solid coupling. Alternatively, other couplings known to the person skilled in the art may be used such as riveting, bolting, or a snapring connection.

In an advantageous embodiment, said clutch piston may comprise at least two slots, through which slot one of said at least two protruding fixation elements of said compensation chamber plate extends. This is the shortest, hence the cheapest, way to connect the compensation chamber plate to the drive plate, providing at the same time a rotational locking of the clutch piston to the compensation chamber plate and the drive plat. Alternatively, protruding elements of the compensation chamber plate could circumvent a radial edge of the clutch piston, possibly via a notch in such a radial edge.

It is preferred that the actuation unit for a clutch system further comprises a preloading element arranged to preload said clutch piston into a predetermined position, for example into a non-actuating position, wherein said preloading element is located within said compensation chamber, leading to a relatively compact actuation system. Said preloading element can also be placed at any suitable position outside said compensation chamber, as will be clear to the person skilled in the art.

Said preloading element can preferably be fixedly connected to said clutch piston and to said compensation chamber plate, in order to avoid rotation of said preloading element with respect to said clutch piston and/or said compensation chamber plate. Alternatively, said rotation of said preloading element with respect to said clutch piston and/or said compensation chamber plate may also be blocked by fixedly connecting said preloading element at a centre or axis of rotation of said clutch piston and/or said compensation chamber plate.

In an advantageous embodiment, said preloading element may comprise a disc spring. A disc spring is an adequate, yet simple and easy to build preloading element for this application, as is known to the person skilled in the art. Alternatively, in a more advantageous embodiment, said preloading element may comprise a spring pack including a plurality of springs arranged between a first ring element and a second ring element. A spring pack is relatively easy to position and to keep in place radially during piston movement.

In a preferred embodiment, said first ring element and said second ring element of said spring pack each can comprise at least one notch arranged to receive a corresponding positioning element located within said compensation chamber on said clutch piston and on said compensation chamber plate. Such a corresponding positioning element can for example be a protruding element, such as a bump, on said clutch piston and on said compensation chamber plate, fitting into a corresponding notch on a ring element of the spring pack. A bump-notch connection takes up relatively little space and is relatively easy to assemble. Alternatively, said first and/or second ring element of the spring pack may comprise a bolt receiving hole to connect the spring pack to the compensation chamber plate and/or the clutch piston.

Another aspect of the invention provides a clutch system of a motor vehicle drivetrain comprising at least one clutch, wherein said clutch is actuatable by an actuation unit according to any of the preceding claims. Such a clutch system can provide one or more of the above-mentioned advantages.

In a preferred embodiment, the clutch system may comprise a clutch carrier fixedly connected to said drive plate. In this way, the torque from the input shaft of the clutch system is transmitted via the drive plate to the clutch carrier, carrying part of said at least one clutch. If said clutch is in a closed position, the received torque can be further transmitted to a clutch hub and an inner primary transmission input shaft. If said clutch is in an open position, torque transmission towards said clutch hub is interrupted.

Said drive plate can preferably be provided with a set of at least two slots, arranged to each receive a protruding element from said clutch carrier. Said at least two slots provide a rotational locking of the clutch carrier to the drive plate. Alternatively, said drive plate may comprise protruding elements, which may be received in corresponding slots in said clutch carrier. Other connections may as well be used, for example a protruding element from one of the drive plate or the clutch carrier being received in a corresponding groove on the other of said clutch carrier and said drive plate, or for example a welded connection between said drive plate and said clutch carrier, as will be clear to a person skilled in the art.

More preferably, said protruding element from said clutch carrier is arranged to grip a circlip located on said drive plate, providing an extra strong coupling between said drive plate and said clutch carrier. Alternatively, said protruding element from said clutch carrier may be welded to said drive plate.

In a most preferred embodiment, the clutch system according to the invention can further comprise a planetary gear set including a ring gear, a sun gear, and at least one planet gear supported by a planet carrier, allowing to combine and transmit two input torques into a single output torque with a certain ratio.

In an advantageous embodiment, said planet carrier can include two carrying plate elements in between which said at least one planet gear is located. In this way, sufficient support can be provided to said planet gear.

In a more advantageous and innovative embodiment, at least one of said two carrying plate elements of said planet carrier may comprise a connecting element to connect said planet carrier to for example an outer primary shaft, wherein said connecting element and one of said two carrying plate elements of said planet carrier can be made of a single piece of material, for example of steel, for example of deep-drawn steel, leading to a relatively solid way of connecting said planet carrier to for example an outer primary shaft.

It is preferred that said planetary gear set is located within a space defined by said drive plate and said clutch carrier. In this way, a relatively compact clutch system can be provided. Alternatively, the planetary gear set can also be positioned outside said space, as will be clear to the person skilled in the art.

Said ring gear of said planetary gear set can preferably be fixedly connected with said clutch carrier, in order to transfer torque from the input shaft of the clutch via said drive plate and said clutch carrier to said ring gear, which forms one of the two inputs of the planetary gear set, the other input for example being the sun gear which may be connected to for example a braking system of a motor vehicle.

Further advantageous embodiments are represented in the subclaims.

The invention will further be elucidated on the basis of exemplary embodiments which are represented in a drawing. The exemplary embodiments are given by way of non-limitative illustration.

It is noted that the figures are only schematic representations of embodiments of the invention that are given by way of non-limiting example. In the figures, the same or corresponding parts are designated with the same reference numerals.

Figure 1:
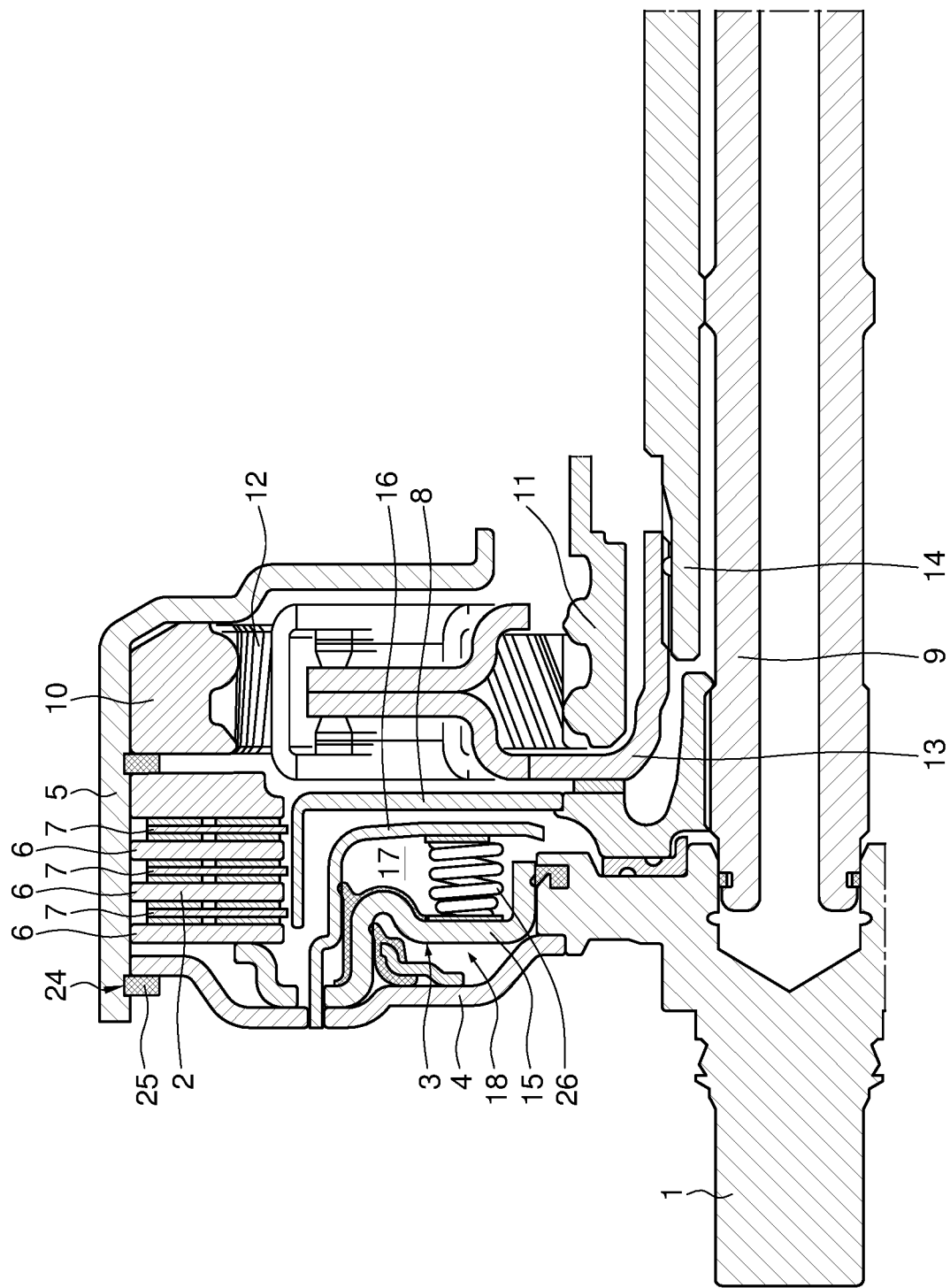
FIG. 1 shows a schematic sectional view through one half of an exemplary embodiment of clutch system according to an aspect of the invention.

FIG. 1 shows a schematic sectional view through one half of an exemplary embodiment of clutch system of a motor vehicle drivetrain according to an aspect of the invention. The clutch system of a motor vehicle drivetrain, for installation between a driving unit and a transmission, which can for example be a dual or multiple clutch transmission, a continuously variable transmission or a power shift transmission, comprises an input shaft 1 which can be coupled to a driving unit, for example to an internal combustion engine. The clutch system comprises at least one clutch 2, wherein said clutch 2 is actuatable by an actuation unit 3. The at least one clutch 2 is preferably of a wet-running multi-plate clutch type. A drive plate 4 is mounted on the input shaft 1 of said clutch system, and is arranged to transmit torque from said input shaft 1 to a clutch carrier 5 fixedly connected to said drive plate 4. Said clutch carrier 5 is connected to the outer plates 6 of said clutch 2. When said clutch 2 is in an open position, further torque transmission is interrupted. However, when said clutch 2 is in a closed position, i.e. when the outer plates 6 of the clutch 2 are in frictional contact with inner plates 7 of said clutch, torque from the input shaft 1 is transmitted via said drive plate 4 and said clutch carrier 5 to a clutch hub 8, which is connected to said inner plates 7 of said clutch 2. The clutch hub 8 is connected to a first output shaft, for example an inner primary shaft 9, which may be connected to a transmission of the motor vehicle drivetrain.

The exemplary embodiment of the clutch system in FIG. 1 further comprises a planetary gear set including a ring gear 10, a sun gear 11, and at least one planet gear 12 supported by a planet carrier 13. In this embodiment, said planetary gear set is located within a space defined by said drive plate 4 and said clutch carrier 5. The ring gear 10 of said planetary gear set is fixedly connected with said clutch carrier 5 and is arranged to transfer torque from said clutch carrier 5 to said planet gear 12 with a certain ratio. The sun gear 11 may for example be coupled to a braking system (not shown).

The planet carrier 13 may for example be connected to an outer primary shaft 14, which may be connected to a transmission of the motor vehicle drivetrain.

Figure 2:
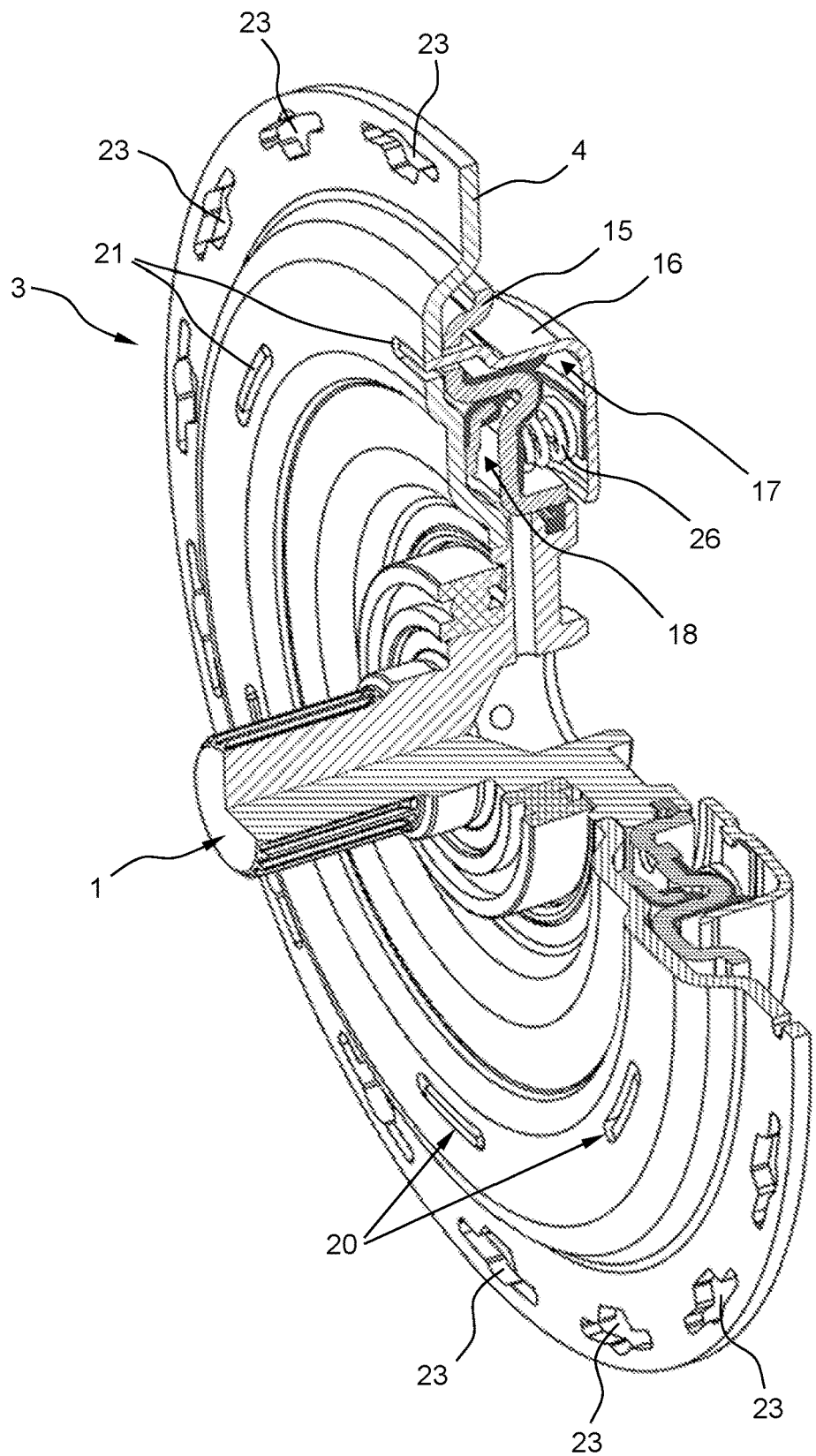
FIG. 2 shows a perspective opened-up schematic view on a preferred embodiment of an actuation unit for a clutch system of FIG. 1.
Figure 3A:
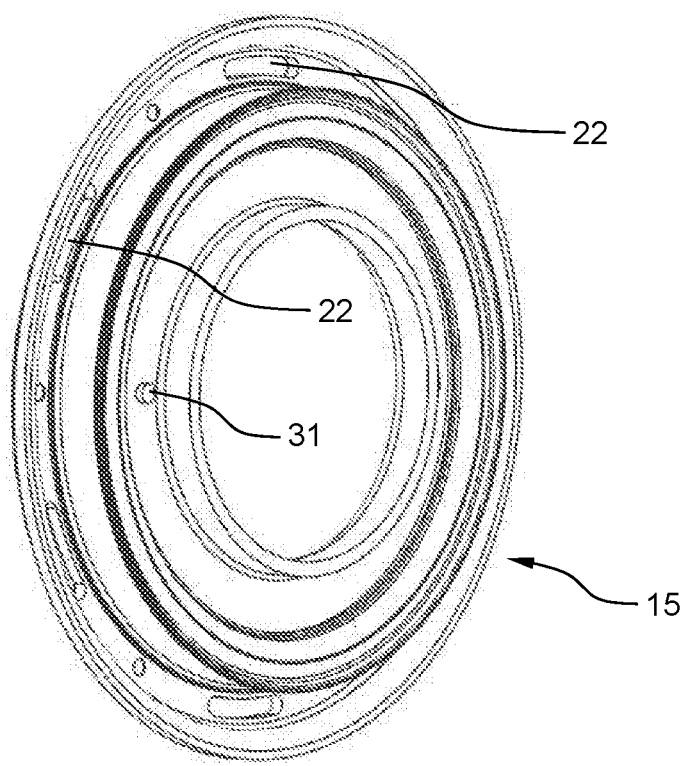
FIGS. 3a and 3b show a perspective view on a clutch piston and a compensation chamber plate respectively of an actuation unit of FIG. 2.
Figure 3B:
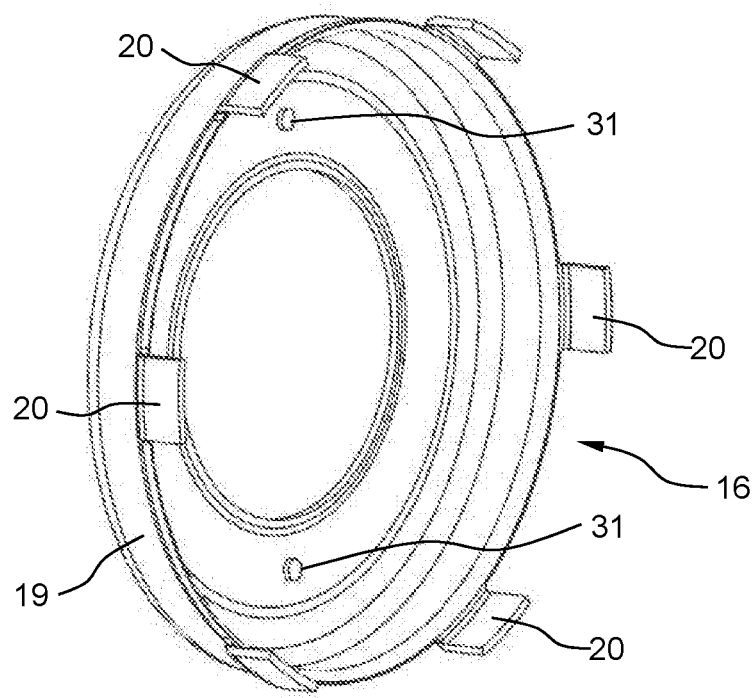
Figure 3C:
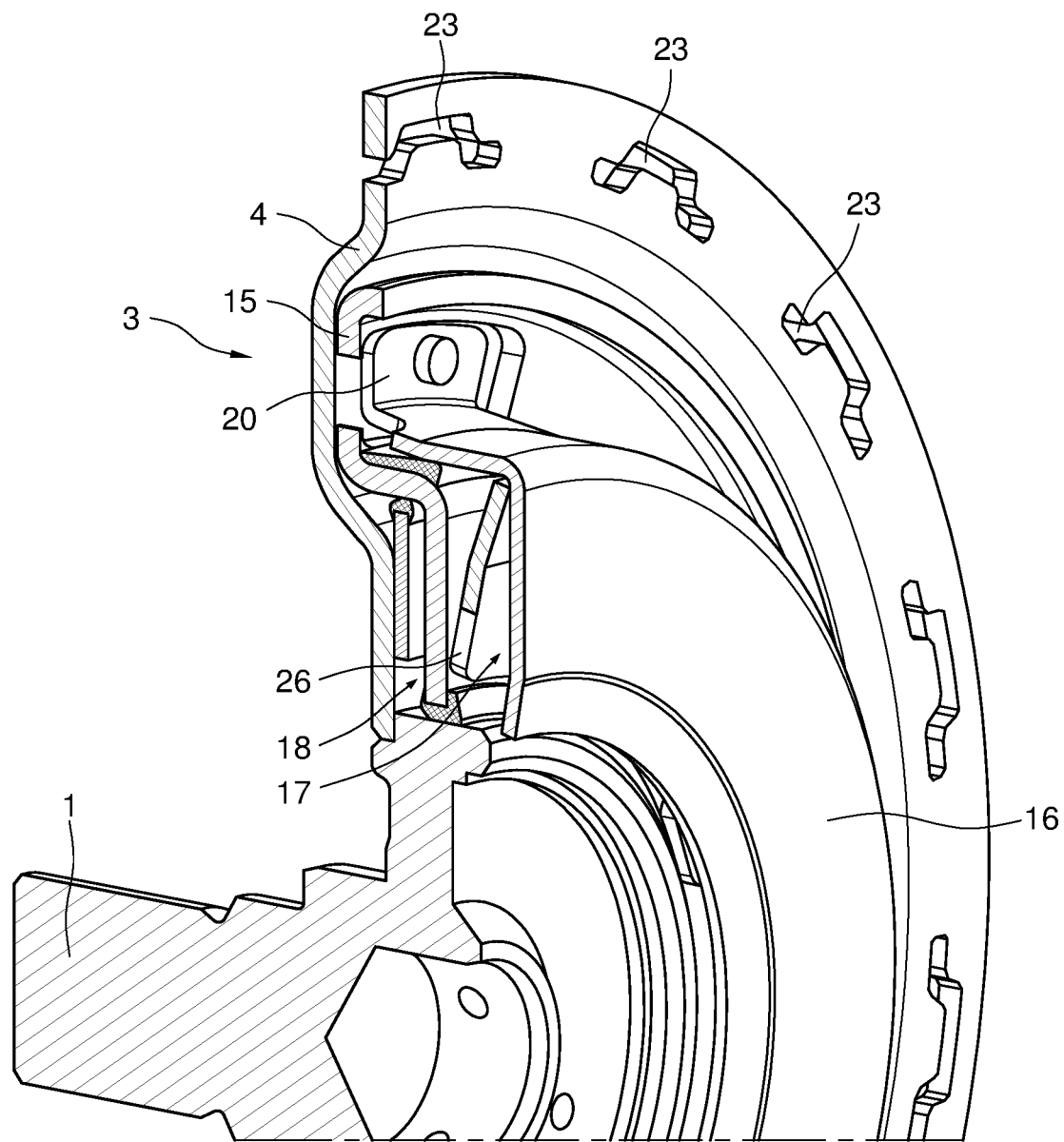
FIG. 3c shows a perspective opened-up schematic view on an alternative embodiment of an actuation unit for a clutch system of FIG. 1.

FIG. 2 shows a perspective opened-up schematic view on a preferred embodiment of an actuation unit 3 for a clutch system of FIG. 1. Such an actuation unit 3 comprises a drive plate 4 mounted on an input shaft 1 of said clutch system, a clutch piston 15 arranged to actuate a clutch 2 of said clutch system, and a compensation chamber plate 16 defining a compensation chamber 17. Said clutch piston 15 separates a pressure chamber 18 between said drive plate 4 and said clutch piston 15 from said compensation chamber 17 between said clutch piston 15 and said compensation chamber plate 16. Said pressure chamber 18 contains a hydraulic fluid for hydraulically actuating said clutch piston 15, and said compensating chamber 17 is arranged to compensate centrifugal force pressure on said clutch piston 15. In an innovative way, said compensation chamber plate 16 is fixedly connected to said drive plate 4. This can be done in various ways. As for example in FIG. 3b, which shows a perspective view on a compensation chamber plate 16 of an actuation unit 3 of FIG. 2, a cylindrical wall 19 of said compensation chamber plate 16 may comprise at least two, in this case six, protruding fixation elements 20 arranged to be fixedly connected to said drive plate 4. Said drive plate 4 may comprise a set of at least two receiving slots 21 each arranged to receive one of said at least two protruding fixation elements 20. As can be seen in FIG. 3a, showing a perspective view on a clutch piston 15 of an actuation unit 3 of FIG. 2, said clutch piston 15 may comprise at least two slots 22, through which slot 22 one of said at least two protruding fixation elements 20 of said compensation chamber plate 16 can extend. In the case of FIGS. 2 and 3b, the fixation elements 20 are axially protruding elements 20, but alternatively, radially protruding fixation elements are possible as well, as shown in FIG. 3c, showing a perspective opened-up schematic view on an alternative embodiment of an actuation unit for a clutch system of FIG. 1. In the latter case, the slots 22 in said clutch piston 15 may rather be somewhat larger holes in which fit the radially protruding fixation elements 20, and the drive plate 4 need not comprise said receiving slots 21. In both cases, of axially protruding fixation elements 20 as in FIGS. 2 and 3b, or radially protruding fixation elements 20 as in FIG. 3c, said compensation chamber plate 16 may for example be welded to said drive plate 4, for example laserwelded, or fixedly connected to it by any other known connection means, for example bolted or riveted as in FIG. 3c. The drive plate 4 of FIGS. 2 and 3c is further provided with a set of at least two slots 23, arranged to each receive a protruding element 24 from said clutch carrier 5. Said set of slots 23 are located radially outwardly from the optional receiving slots 21 arranged to receive one of said at least two protruding fixation elements 20 from the compensation chamber plate 16. Said protruding element 24 from said clutch carrier 5 may be arranged to clip on a circlip 25 located on said drive plate 4.

Figure 4:
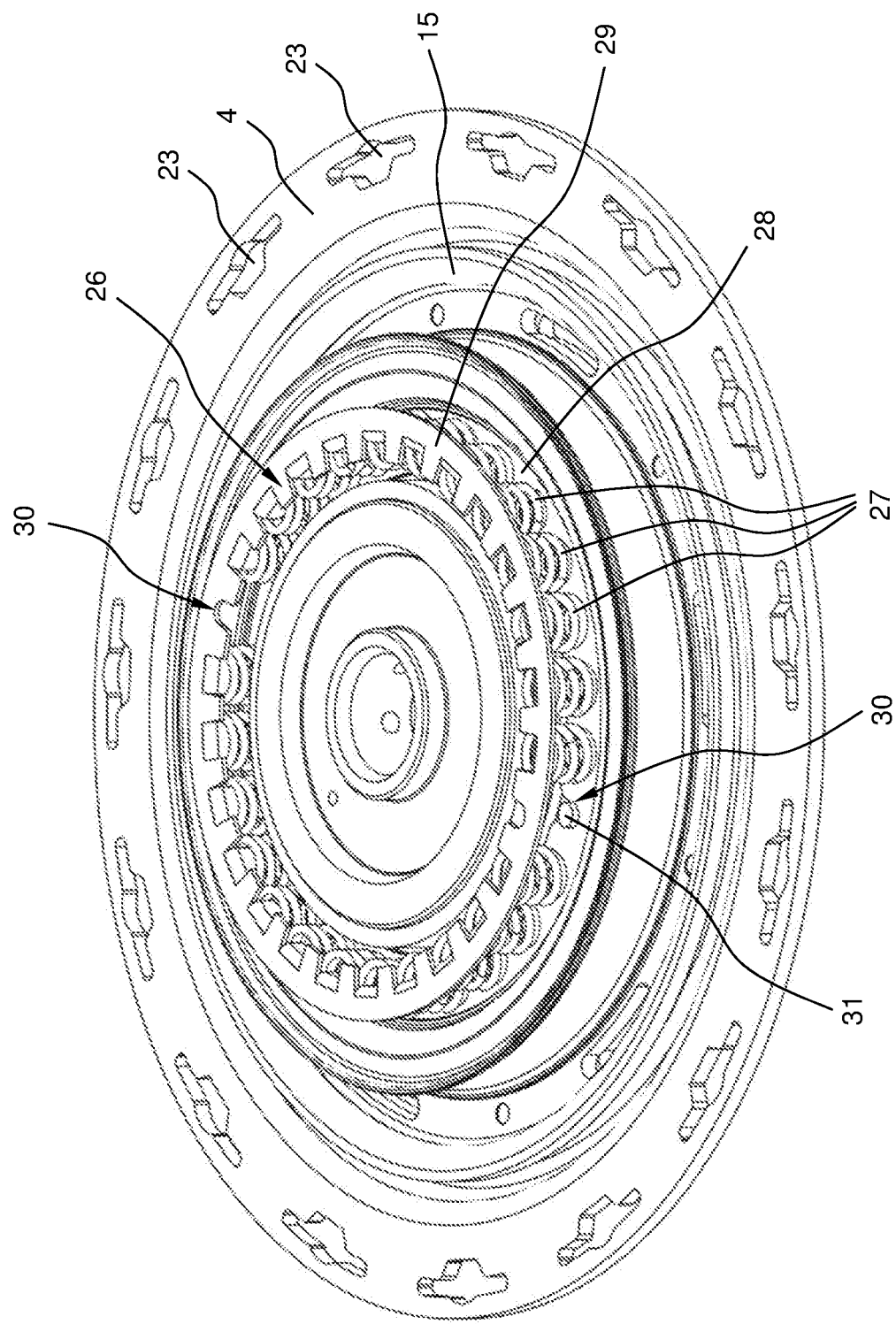
FIG. 4 shows a perspective plan view on an inside of an actuation unit of FIG. 2.

FIG. 4 shows a perspective plan view on an inside of an actuation unit 3 of FIG. 2. The actuation unit can further comprise a preloading element 26 arranged to preload said clutch piston 15 into a predetermined position, for example into a non-actuating position, wherein said preloading element 26 is located within said compensation chamber 17. Said preloading element 26 may be fixedly connected to said clutch piston 15 and to said compensation chamber plate 16 (not shown in FIG. 4). Said preloading element 26 may for example comprise a disc spring, as shown in FIG. 3c, or may for example comprise a spring pack including a plurality of springs 27, preferably spiral compression springs, arranged between a first ring element 28 and a second ring element 29, as in FIG. 4. In order to fixedly connect the spring pack to said clutch piston 15 and to said compensation chamber plate 16, said first ring element 28 and said second ring element 29 of said spring pack each can comprise at least one notch 30 arranged to receive a corresponding positioning element 31 located within said compensation chamber 17 on said clutch piston 15 and on said compensation chamber plate 16 (see FIGS. 3a and 3b). Alternatively, the spring pack may be fixed to said clutch piston 15 and to said compensation chamber plate 16 in other known ways. Or the spring pack may not be connected to said clutch piston 15 and to said compensation chamber plate 16 but may only be firmly held in its position, for example by providing said ring elements with radially deformable protrusions to squeeze the spring pack into its position, as is for example disclosed in US 2015/0240887. In still another alternative embodiment, said preloading element 26, in particular a disc spring as in FIG. 3c, may also be centered and firmly held in position, especially radially, around an axis of rotation of said clutch piston and/or said compensation chamber plate in order to block any rotation and or movement of said preloading element with respect to said clutch piston and/or said compensation chamber plate.

Figure 5B:
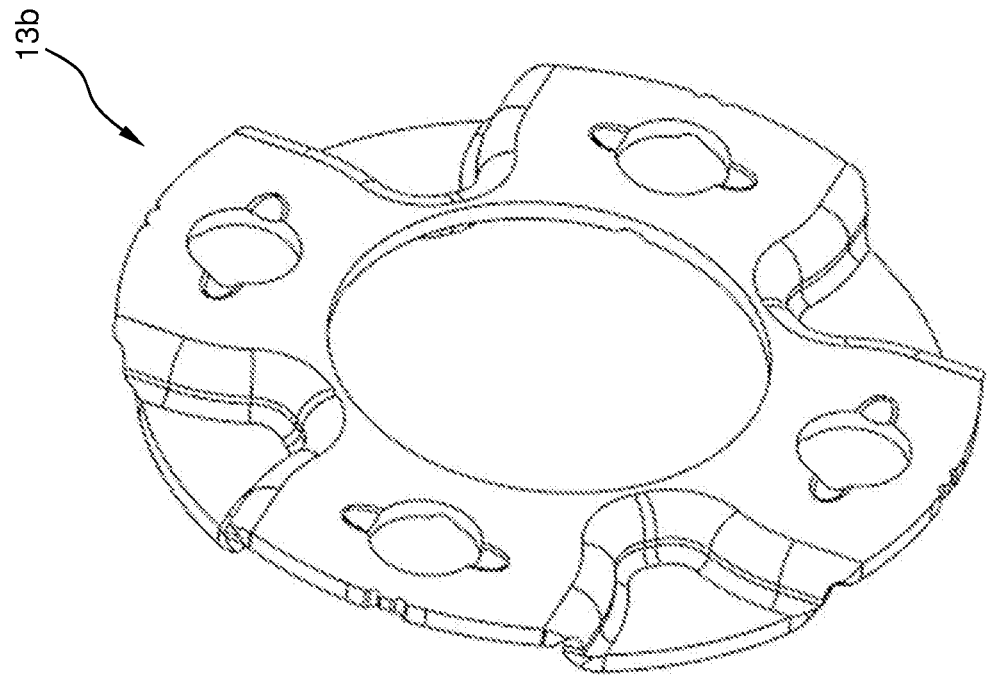
FIGS. 5a and 5b show a perspective view on a preferred embodiment of a planet carrier in a clutch system of FIG. 1.
Figure 5A:
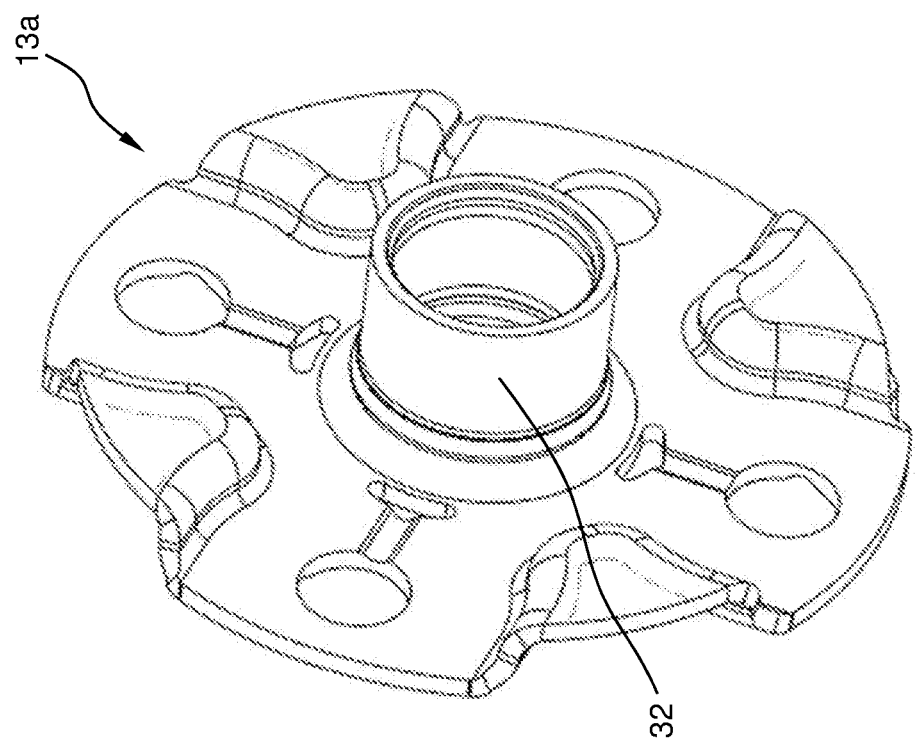
Figure 6:
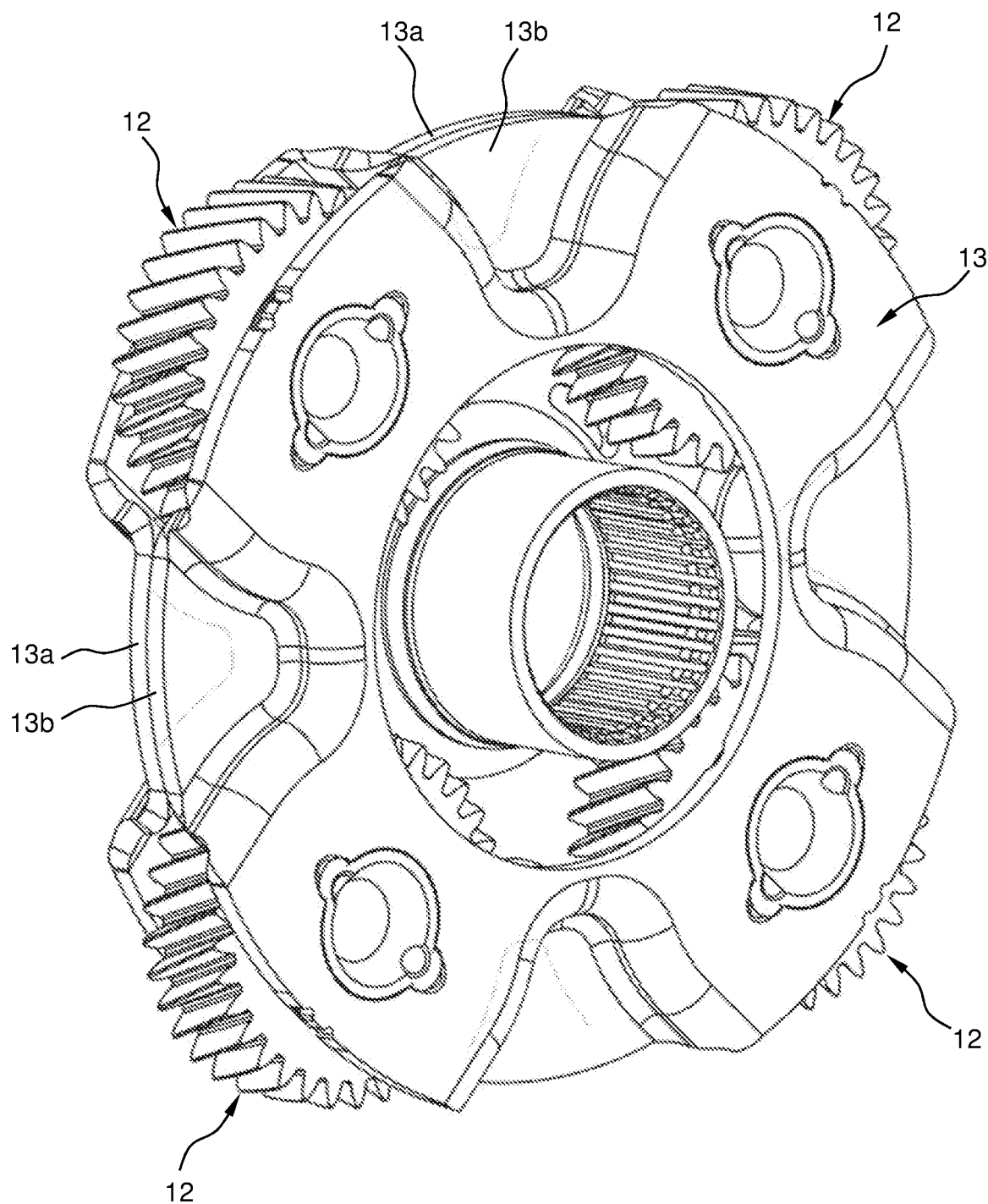
FIG. 6 show a perspective view on the planet carrier of FIG. 5 including the planet gears.

FIGS. 5a and 5b show a perspective view on a preferred embodiment of a planet carrier 13 in a clutch system of FIG. 1, and FIG. 6 shows a perspective view on the planet carrier 13 of FIG. 5 including the planet gears 12.

Said planet carrier 13 can include two carrying plate elements 13a and 13b in between which said at least one planet gear 12 is located. At least one of said two carrying plate elements 13a or 13b of said planet carrier 13 comprises a connecting element 32 to connect said planet carrier 13 to for example an outer primary shaft 14, which may be connected to a transmission of the motor vehicle drivetrain. In the inventive embodiment of a planet carrier 13 in FIG. 5, said connecting element 32 and one of said two carrying plate elements, in this case 13a, of said planet carrier 13 are made of a single piece of material, for example of steel, for example of deep-drawn steel or another sheet metal. Alternatively, said connecting element 32 may be made as a separate piece and be welded to one of said two carrying plate elements 13a, which may be easier in production, but may lead to a less solid construction than a single deep-drawn element.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

Many variants will be apparent to the person skilled in the art. All variants are understood to be comprised within the scope of the invention defined in the following claims.

LIST OF REFERENCE NUMBERS

1. Input shaft
2. Clutch
3. Actuation unit
4. Drive plate
5. Clutch carrier
6. Outer clutch plates
7. Inner clutch plates
8. Clutch hub
9. Inner primary shaft
10. Ring gear
11. Sun gear
12. Planet gear
13. Planet carrier
14. Outer primary shaft
15. Clutch piston
16. Compensation chamber plate
17. Compensation chamber
18. Pressure chamber
19. Cylindrical wall of 16
20. Protruding fixation elements
21. Receiving slots in drive plate 4
22. Slots in clutch piston 15
23. Slots in drive plate 4 (outward)
24. Protruding element of 5
25. Circlip
26. Preloading element
27. Springs
28. First ring element
29. Second ring element
30. Notch
31. Positioning element

The invention claimed is:

1. Actuation unit for a clutch system of a motor vehicle drivetrain comprising:
    a drive plate mounted on an input shaft of said clutch system;
    a clutch piston arranged to actuate a clutch of said clutch system;
    a compensation chamber plate defining a compensation chamber;
    wherein said clutch piston separates a pressure chamber between said drive plate and said clutch piston from said compensation chamber between said clutch piston and said compensation chamber plate, said pressure chamber containing a hydraulic fluid for hydraulically actuating said clutch piston, and said compensating chamber being arranged to compensate centrifugal force pressure on said clutch piston,
    wherein said compensation chamber plate is fixedly connected to said drive plate,
    wherein a cylindrical wall of said compensation chamber plate comprises at least two protruding fixation elements arranged to be fixedly connected to said drive plate, and
    wherein said clutch piston comprises at least two slots through which slot one of said at least two protruding fixation elements of said compensation chamber plate extends.

2. The actuation unit according to claim 1, wherein said drive plate comprises a set of at least two receiving slots each arranged to receive one of said at least two protruding fixation elements.

3. The actuation unit according to claim 1, wherein said compensation chamber plate is welded to said drive plate.

4. The actuation unit according to claim 1, further comprising a preloading element arranged to preload said clutch piston into a predetermined position, wherein said preloading element is located within said compensation chamber.

5. The actuation unit according to claim 4, wherein said preloading element is fixedly connected to said clutch piston and to said compensation chamber plate.

6. The actuation unit according to claim 4, wherein said preloading element comprises a disc spring.

7. The actuation unit according to claim 4, wherein said preloading element comprises a spring pack including a plurality of springs arranged between a first ring element and a second ring element.

8. The actuation unit according to claim 7, wherein said first ring element and said second ring element of said spring pack each comprise at least one notch arranged to receive a corresponding positioning element located within said compensation chamber on said clutch piston and on said compensation chamber plat.

9. A clutch system of a motor vehicle drivetrain comprising at least one clutch, wherein said clutch is actuatable by the actuation unit according to claim 1.

10. The clutch system according to claim 9, comprising a clutch carrier fixedly connected to said drive plate.

11. The clutch system according to claim 10, wherein said drive plate is provided with a set of at least two slots, arranged to each receive a protruding element from said clutch carrier.

12. The clutch system according to claim 11, wherein said protruding element from said clutch carrier is arranged to clip on a circlip located on said drive plate.

13. The clutch system according to 9, further comprising a planetary gear set including a ring gear, a sun gear, and at least one planet gear supported by a planet carrier.

14. The clutch system according to claim 13, wherein said planet carrier includes two carrying plate elements in between which said at least one planet gear is located.

15. The clutch system according to claim 14, wherein at least one of said two carrying plate elements of said planet carrier comprises a connecting element to connect said planet carrier to an outer primary shaft, wherein said connecting element and one of said two carrying plate elements of said planet carrier are made of a single piece of material.

16. The clutch system according to claim 13, wherein said planetary gear set is located within a space defined by said drive plate and said clutch carrier.

17. The clutch system according to claim 13, wherein said ring gear of said planetary gear set is fixedly connected with said clutch carrier.

* * * * *